US012753910B2

(12) United States Patent
Huang

(10) Patent No.: US 12,753,910 B2
(45) Date of Patent: Oct. 6, 2026

(54) SOLAR POOL LAMP

(71) Applicant: Shenzhen Maining Innovation Technology Co., Ltd., Shenzhen (CN)

(72) Inventor: Huifeng Huang, Shenzhen (CN)

(73) Assignee: Shenzhen Maining Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/313,782

(22) Filed: Aug. 28, 2025

(65) Prior Publication Data

US 2025/0389412 A1 Dec. 25, 2025

(30) Foreign Application Priority Data

Nov. 4, 2024 (CN) ........................ 202422679789.X

(51) Int. Cl.

*F21S 9/03* (2006.01)
*F21V 15/01* (2006.01)
*F21V 21/088* (2006.01)
*F21W 131/401* (2006.01)

(52) U.S. Cl.

CPC ............ *F21V 21/088* (2013.01); *F21S 9/037* (2013.01); *F21V 15/01* (2013.01); *F21W 2131/401* (2013.01)

(58) Field of Classification Search

None
See application file for complete search history.

(56) References Cited

U.S. PATENT DOCUMENTS

| | | | | |
|---|---|---|---|---|
| 2017/0159927 | A1* | 6/2017 | Hui | F21V 31/00 |
| 2018/0306389 | A1* | 10/2018 | Lin | F21L 4/08 |
| 2021/0048155 | A1 | 2/2021 | Sreshta et al. | |
| 2022/0341554 | A1 | 10/2022 | Xu | |
| 2024/0064885 | A1 | 2/2024 | Sreshta et al. | |
| 2025/0251100 | A1* | 8/2025 | Wan | F21V 31/005 |

FOREIGN PATENT DOCUMENTS

CN 219063190 U * 5/2023

OTHER PUBLICATIONS

English Translation of CN-219063190-U (Year: 2023).*

* cited by examiner

*Primary Examiner* — Thien M Le
*Assistant Examiner* — April A Taylor

(57) ABSTRACT

A solar pool lamp includes a solar module and an illumination module. The solar module includes a solar module housing, a solar panel, and a first contact member. The solar panel is disposed on the solar module housing, the first contact member is disposed in the solar module housing, and the first contact member is electrically connected to the solar panel. The illumination module includes an illumination module housing and an illumination lamp assembly. The illumination lamp assembly is mounted in the illumination module housing, a second contact member is provided at the top end of the illumination module housing, and the second contact member is electrically connected to the illumination lamp assembly. The illumination module housing and the solar module housing are detachably connected, and when connected, the first contact member and the second contact member abut against each other to form an electrical connection.

9 Claims, 9 Drawing Sheets

SOLAR POOL LAMP

CROSS-REFERENCE TO RELATED APPLICATIONS

This application claims priority to Chinese Patent Application No. 202422679789. X with a filing date of Nov. 4, 2024. The content of the aforementioned application, including any intervening amendments thereto, is incorporated herein by reference.

TECHNICAL FIELD

The present disclosure relates to the field of swimming pool illumination, and in particular to a solar pool lamp.

BACKGROUND

A swimming pool is a place for aquatic recreation and competition, where people can engage in activities or participate in competitions. Due to busy work or study schedules, people often swim not only during the day but also at night. At night or in low-light conditions, swimming pool lamps provide illumination for the swimming pool, allowing swimmers and other water activity participants to operate in a safe environment, thereby improving the safety in the swimming pool area, and providing better visibility.

Existing swimming pool lamps are mostly of an adsorption type such as suction cups, which not only limits power supply modes but also makes battery replacement cumbersome. For other types of swimming pool lamps, such as those powered by wired commercial electricity, users need to secure lamp bodies first, then connect cable plugs to sockets. This not only poses a tripping hazard but also makes the operation cumbersome.

SUMMARY OF PRESENT INVENTION

The present disclosure provides a solar pool lamp, to overcome defects in the prior art.

To solve the above technical problems, the present disclosure provides the following technical solutions: a solar pool lamp, including a solar module and an illumination module; the solar module includes a solar module housing, a solar panel, and a first contact member; the solar panel is disposed on the solar module housing, the first contact member is disposed in the solar module housing, and the first contact member is electrically connected to the solar panel; the illumination module includes an illumination module housing and an illumination lamp assembly; the illumination lamp assembly is mounted in the illumination module housing, a second contact member is provided at the top end of the illumination module housing, and the second contact member is electrically connected to the illumination lamp assembly; and the illumination module housing and the solar module housing are detachably connected, and when the illumination module housing and the solar module housing are connected, the first contact member and the second contact member abut against each other to form an electrical connection.

Furthermore, the solar module housing includes a first housing and a second housing snapped together, the solar panel is mounted on an upper surface of the first housing, and the first contact member is mounted in the second housing.

Furthermore, the solar module further includes a clamping member, the second housing is provided with a clamped portion configured to engage the clamping member, a sliding slot is formed in the second housing, and an upper part of the clamping member is slidably arranged in the sliding slot.

Furthermore, the solar module further includes a knob and a screw rod, the screw rod is rotatably mounted in the sliding slot, one end of the screw rod extends outwardly from the sliding slot and is connected to the knob, and the upper part of the clamping member is threadedly connected to the screw rod.

Furthermore, the illumination module housing includes a bottom housing, a sealing housing, and a decorative housing; a sealing groove is formed along a periphery of the bottom housing, the sealing housing is snapped onto the sealing groove of the bottom housing, and the decorative housing covers the sealing housing and is in snap-fit with the bottom housing.

Furthermore, the decorative housing is provided with a through hole, and light of the illumination lamp assembly passes through the sealing housing and exits from the through hole of the decorative housing.

A pressing member is respectively provided on two sides of an upper part of the decorative housing and is used for snap-fit with the solar module housing, and first elastic member for providing an elastic force for the pressing member is provided inside the pressing member.

Furthermore, the solar module further includes a slider, a clamping member, and a second elastic member; the second housing is provided with a clamped portion configured to engage the clamping member, the slider is slidably connected to the second housing, the clamping member is connected to an end of the slider facing away from the clamped portion, and the second elastic member is connected between the clamped portion and the clamping member.

The illumination lamp assembly includes a main control board, a battery, and a lamp bead board; the main control board is electrically connected to the battery via wiring, the lamp bead board is electrically connected to the main control board via wiring, and the second contact member is electrically connected to the main control board via wiring.

Furthermore, the lamp bead board is arranged obliquely.

The beneficial effects achieved by the present disclosure are: the solar module and the illumination module of the present disclosure realize a contact type of split and detachable electrical connection, which is convenient for users to replace illumination modules of different power or brightness. In addition, using solar energy for power supply can also reduce the layout of cable plugs and sockets, and the mounting mode and position are more flexible and simpler.

BRIEF DESCRIPTION OF THE DRAWINGS

The accompanying drawings are provided for further understanding the present disclosure, and constitute a part of the specification. The accompanying drawings cooperate with embodiments of the present disclosure to explain the present disclosure, but do not limit the present disclosure. In the accompanying drawings.

In the accompanying drawings: 100. Solar pool lamp;

1. Solar module; 11. Solar panel; 12. First housing; 13. Second housing; 131. Sliding slot; 132. Clamped portion; 1321. Mounting hole; 14. Clamping member; 15. Knob; 16. Screw rod; 17. First contact member;
2. Illumination module; 21. Bottom housing; 211. Sealing groove; 22. Sealing housing; 221. Mounting post; 23. Decorative housing; 231. Baffle; 232. Through hole; 24. Second contact member; 25. Main control board; 26. Battery; 27. Lamp bead board; 28. Pressing member; 29. First elastic member;
3. Slider; and 4. Second elastic member.

DETAILED DESCRIPTION OF THE EMBODIMENTS

The preferred embodiments of the present disclosure are described below with reference to the accompanying drawings. It should be understood that the preferred embodiments described herein are only used to illustrate and explain the present disclosure, rather than to limit the present disclosure.

Embodiment 1

Figure 1:
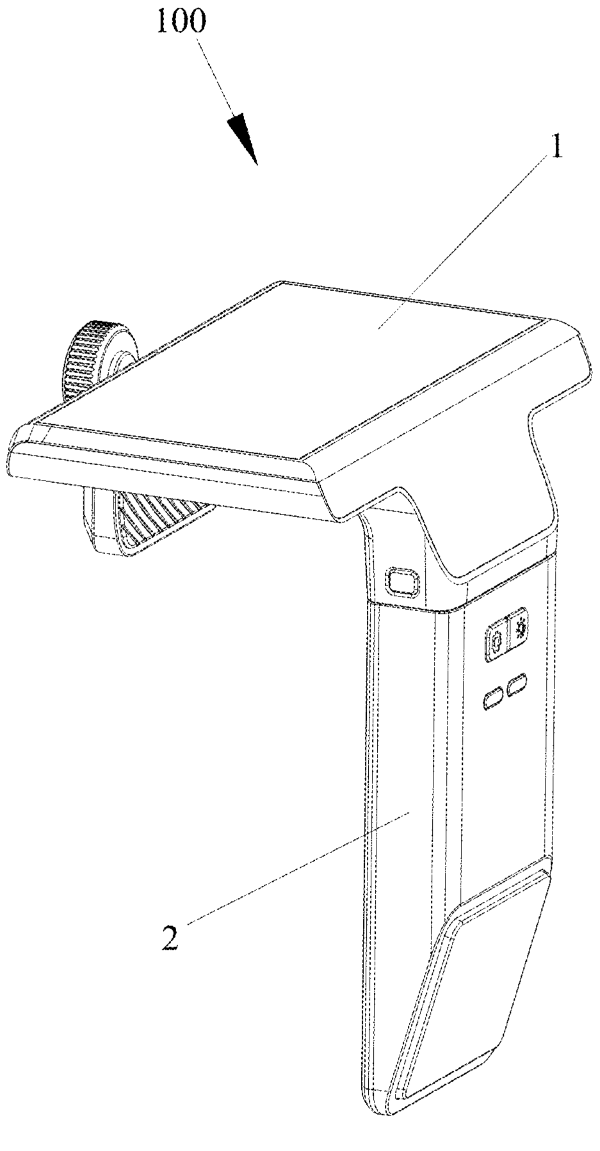
FIG. 1 is a schematic diagram showing the overall structure of a solar pool lamp according to Embodiment 1 of the present disclosure.

As shown in FIG. 1, a solar pool lamp includes a solar module 1 and an illumination module 2. The illumination module 2 is detachably mounted on the solar module 1, and the two are designed to electrically connect to each other in form of contact connection, which is convenient for users to replace illumination modules 2 of different power or brightness. In addition, using solar energy for power supply can also reduce the layout of cable plugs and sockets, and the mounting mode and position are more flexible and simpler.

Figure 2:
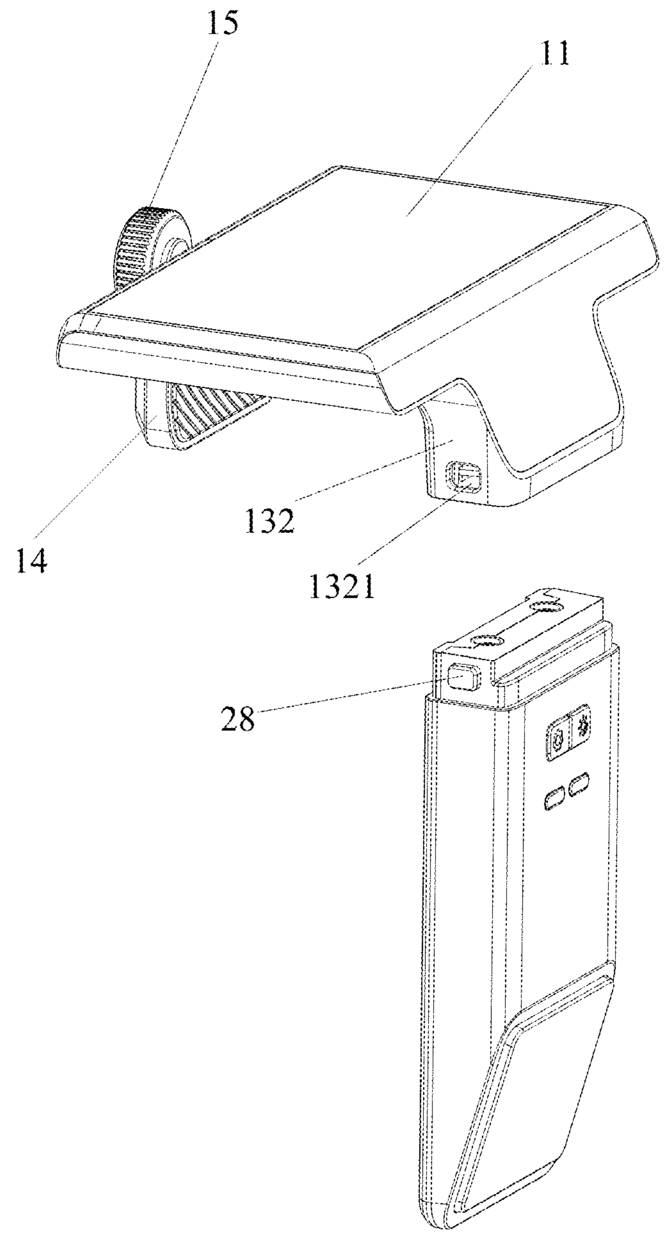
FIG. 2 is an exploded view showing the structure of the solar pool lamp according to Embodiment 1 of the present disclosure.
Figure 3:
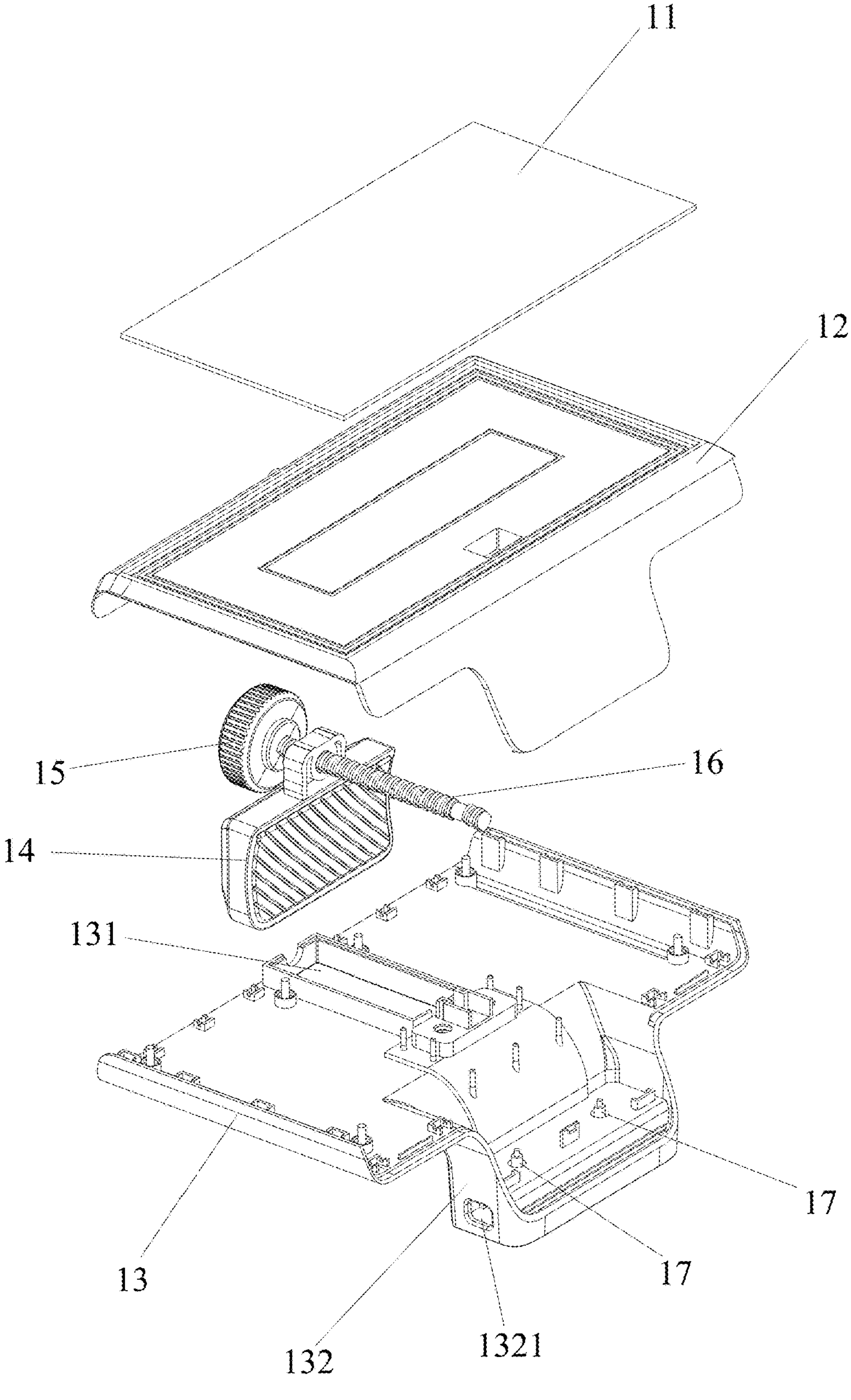
FIG. 3 is an exploded view showing the structure of a solar module in the solar pool lamp according to Embodiment 1 of the present disclosure.

As shown in FIG. 2 and FIG. 3, the solar module 1 includes a solar panel 11, a first housing 12, a second housing 13, a clamping member 14, and a first contact member 17. The solar panel 11 is disposed on the first housing 12, the first housing 12 and the second housing 13 are buckled to form a solar module housing, the first contact member 17 is disposed in the second housing 13, and the first contact member 17 is electrically connected to the solar panel 11. As shown in FIG. 3, a sliding slot 131 is formed in the second housing 13, an upper part of the clamping member 14 is slidably arranged in the sliding slot 131, the second housing 13 is provided with a clamped portion 132 corresponding to the lower part of the clamping member 14, and the clamping member 14 and the clamped portion 132 can cooperate to adapt to different sizes of swimming pool brackets. A clamping surface of the clamping member 14 may be set to be an arc surface, and is provided with a wear-resistant layer, such as a rubber pad, to increase the frictional force with the swimming pool bracket, thereby improving the mounting reliability of the present disclosure.

To make the clamping member 14 move evenly along the sliding slot 131 and keep the clamping effect of the clamping member 14 and the clamped portion 132 on the swimming pool bracket from loosening, the solar module 1 further includes a knob 15 and a screw rod 16. The knob 15 is connected to one end of the screw rod 16, the screw rod 16 is rotatably arranged in the sliding slot 131 and is threadedly connected to the upper part of the clamping member 14, and the knob 15 is twisted to drive the screw rod 16 to rotate together, to make the clamping member 14 move evenly along the sliding slot 131.

Figure 4:
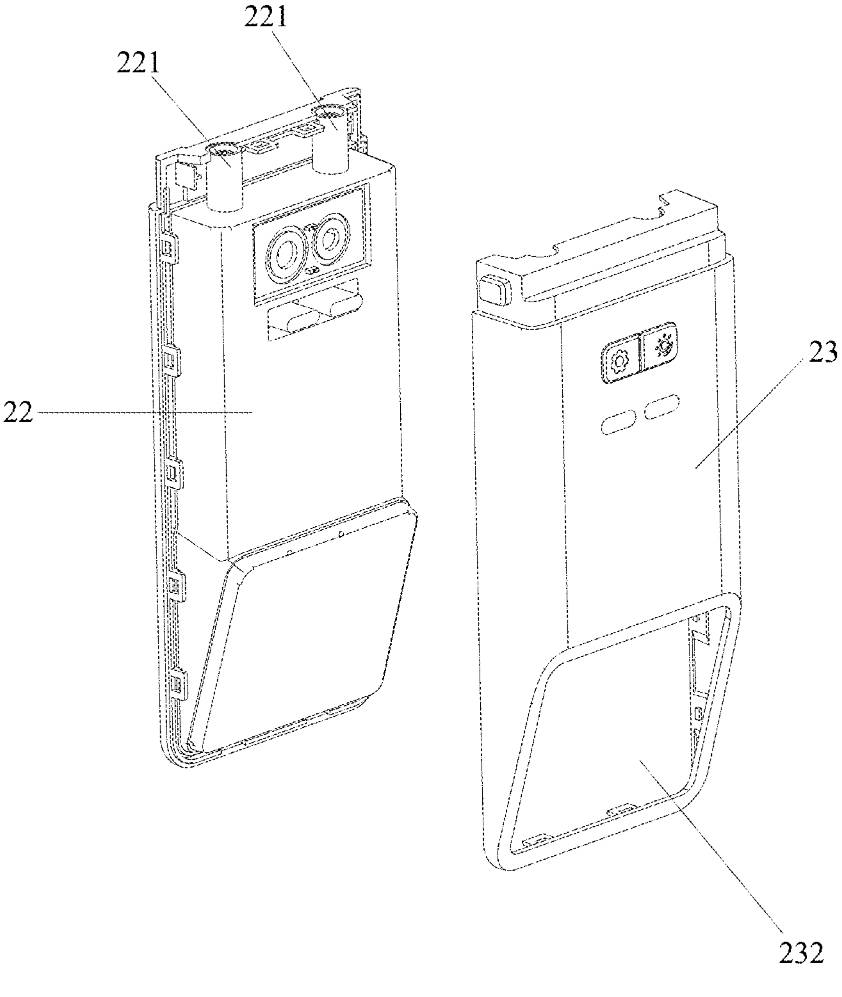
FIG. 4 is exploded view 1 showing the structure of an illumination module in the solar pool lamp according to Embodiment 1 of the present disclosure.
Figure 5:
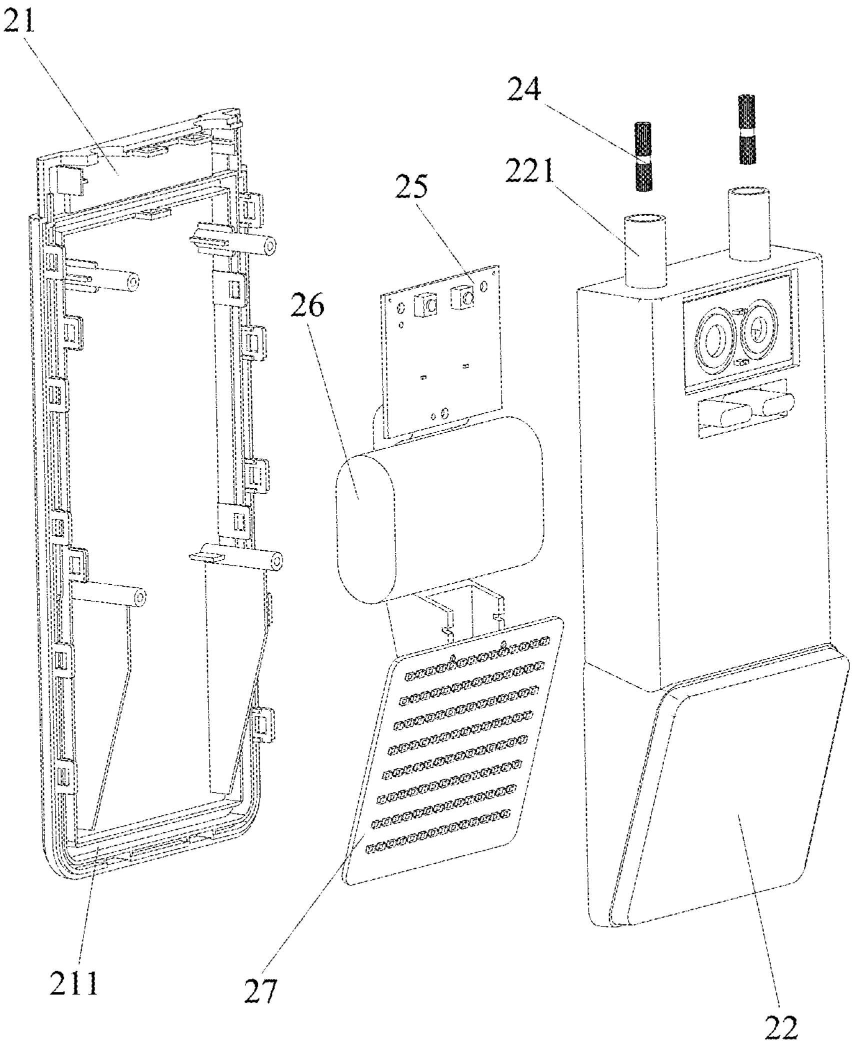
FIG. 5 is exploded view 2 showing the structure of the illumination module in the solar pool lamp according to Embodiment 1 of the present disclosure.
Figure 6:
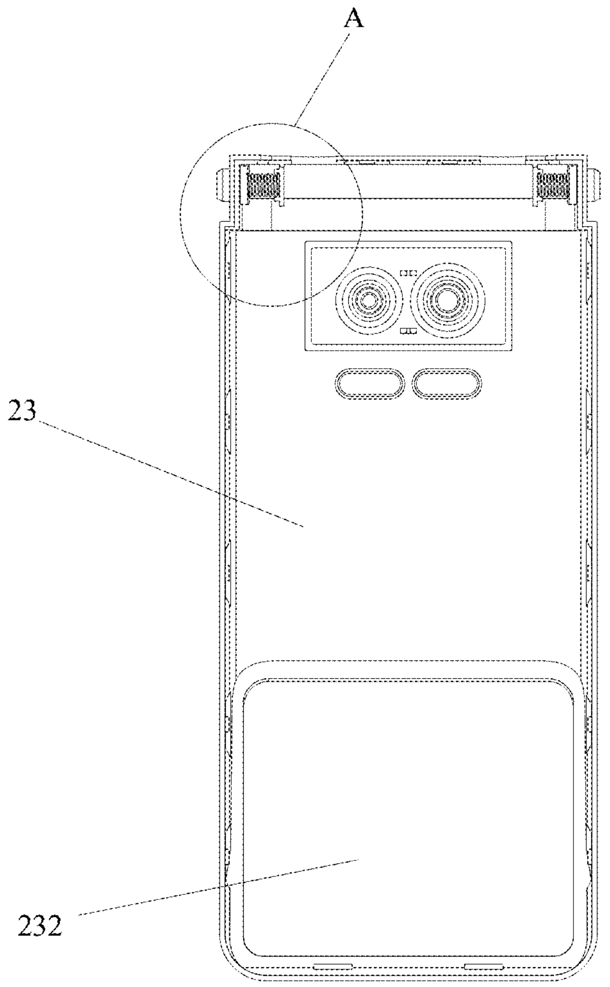
FIG. 6 is a schematic diagram showing the structure of a decorative housing in the solar pool lamp according to Embodiment 1 of the present disclosure.

As shown in FIG. 4 to FIG. 6, the illumination module 2 includes an illumination module housing consisting of a bottom housing 21, a sealing housing 22 and a decorative housing 23, and an illumination lamp assembly provided in the illumination module housing. A sealing groove 211 is formed in the bottom housing, the sealing housing 22 is snapped onto the sealing groove 211 of the bottom housing 21, and silica gel is employed as a sealant for sealing. The illumination lamp assembly is sealed in a space between the sealing housing 22 and the bottom housing 21. The decorative housing 23 covers the sealing housing 22, and is buckled and fixed to a periphery of the bottom housing 21.

The illumination lamp assembly includes a main control board 25, a battery 26, and a lamp bead board 27. The main control board 25 is electrically connected to the battery 26 via wiring, and the lamp bead board 27 is electrically connected to the main control board 25 via wiring.

Mounting posts 221 are provided on the sealing housing 22, a second contact member 24 is provided in the mounting posts 221, and the second contact member 24 is electrically connected to the main control board 25 via wiring.

The solar module 1 and the illumination module 2 are detachably connected together, and when the illumination module housing and the solar module housing are connected, the first contact member 24 and the second contact member 17 come into contact to form an electrical connection. When sunshine conditions permit, the solar panel 11 converts solar energy into electrical energy to form a current loop through the first contact member 17, the second contact member 24, and the main control board 25, the electrical energy is stored in the battery 26, and light is lit up when time conditions are met or when manually activated.

The first contact member 17 and the second contact member 24 are respectively pin contact members and hole contact members, or are all contact reeds.

Furthermore, the main control board 25, the battery 26, and the lamp bead board 27 are fixed on a same mounting bracket, and the mounting bracket is fixed to the inner side of the bottom housing 21. The main control board 25, the battery 26, and the lamp bead board 27 are fixedly mounted in sequence from top to bottom, and the lamp bead board 27 is arranged to be tilted downward to a position below the water surface of the swimming pool; and the tilted downward arrangement of the lamp bead board 27 is helpful for the light to be diffused into different regions of the water, and hence larger area of the water and the bottom of the swimming pool can be lightened.

To allow light to pass through, the sealing housing 22 is fully transparent, or the part of the sealing housing 22 corresponding to the lamp bead board 27 is transparent. Correspondingly, a through hole 232 is formed in the part of the decorative housing 23 corresponding to the lamp bead board 27, to allow the light to pass through the sealing housing 22 and then pass through the decorative housing 23 from the through hole 232.

In other embodiments, the decorative housing 23 and the sealing housing 22 may also be set to be an integral structure, and it is only necessary to set the position corresponding to the lamp bead board 27 to be transparent so that the light can pass through.

Figure 7:
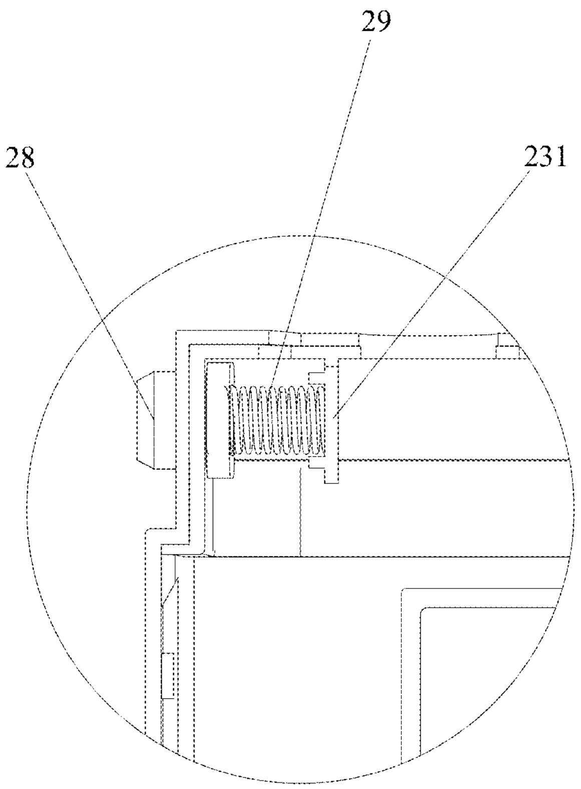
FIG. 7 is an enlarged view showing the structure at a position A shown in FIG. 6.

As shown in FIG. 6 and FIG. 7, to detachably connect the solar module 1 to the illumination module 2, the illumination module 2 further includes a pressing member 28 and a first elastic member 29. The clamped portion 132 of the solar module 1 is provided with mounting holes 1321 for the pressing member 28 to be fitted in. The pressing member 28 is disposed in through holes at the upper end of the decorative housing 23. The decorative housing 23 or the bottom housing 21 is provided with baffles 231 in cooperation with the first elastic member 29. The first elastic member 29 abuts between the baffle 231 and the pressing member 28. The elastic force of the first elastic member 29 pushes the pressing member 28 to expose from the through holes. The first elastic member 29 may be springs, rubber members, etc. When the solar module 1 is connected to the illumination module 2, the pressing member 28 can remain in an extended state under the elastic force of the first elastic member 29 and be stuck in the mounting holes 1321, thereby preventing the pressing member 28 from falling off from the mounting holes 1321. There are two groups of pressing members 28 and two groups of first elastic members 29, which are arranged on two opposite sides of the upper end of the decorative housing 23. When the illumination module 2 needs to be removed, it is only necessary to press the pressing member 28 to disengage the pressing member 28 from the mounting holes 1321.

During use, the assembled solar pool lamp 100 is clamped and fixed to a railing of a swimming pool by means of the clamping member 14 and the clamped portion 132, and part of the lamp bead board 27 and the through hole 232 corresponding to the lamp bead board 27 are below the water surface. Since the solar pool lamp 100 adopts a double-layer housing sealing structure of the sealing housing 22 and the decorative housing 23, it can be ensured that water cannot enter the sealing housing 22.

Embodiment 2

Figure 8:
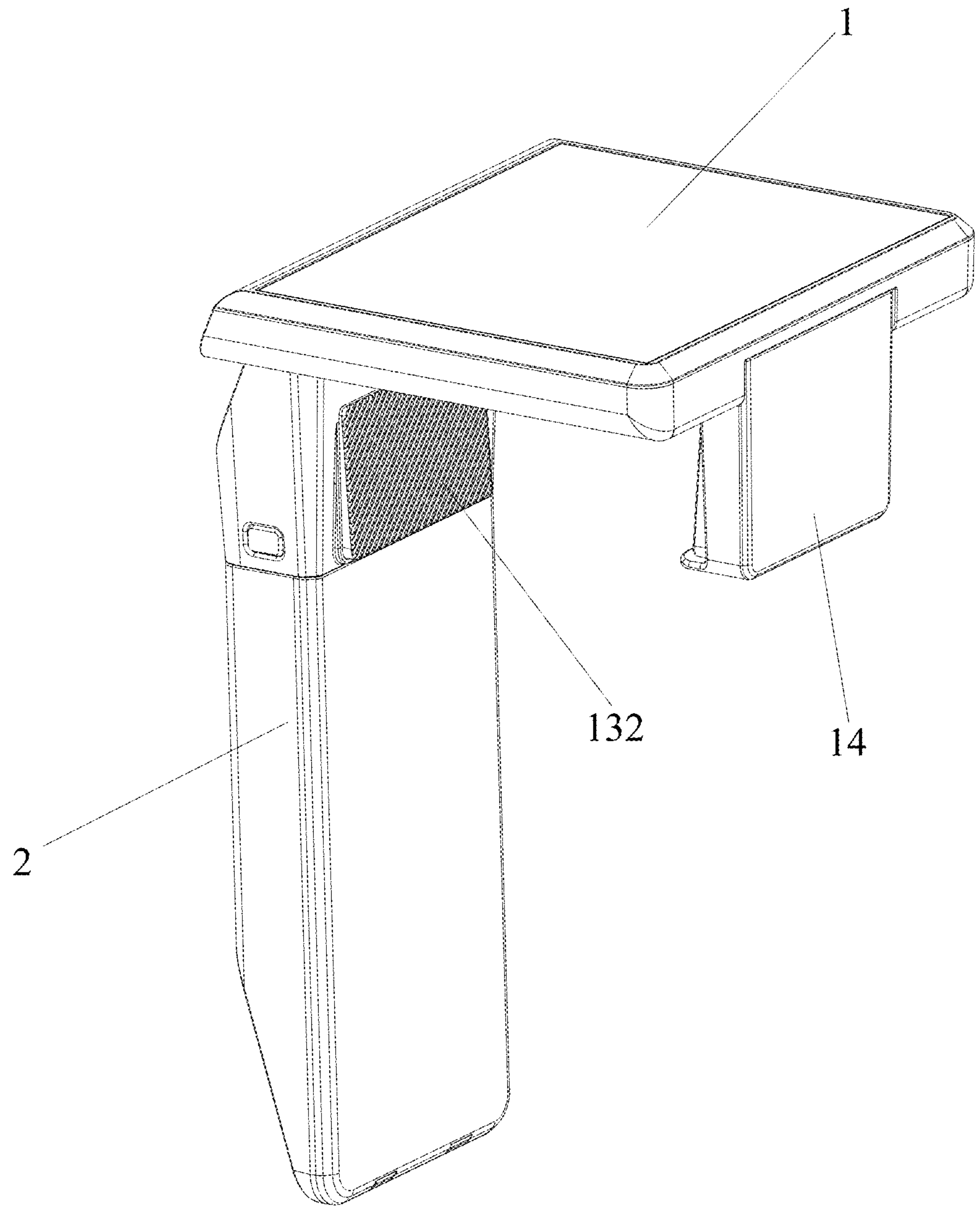
FIG. 8 is a schematic diagram showing a solar module in the solar pool lamp according to Embodiment 2.
Figure 9:
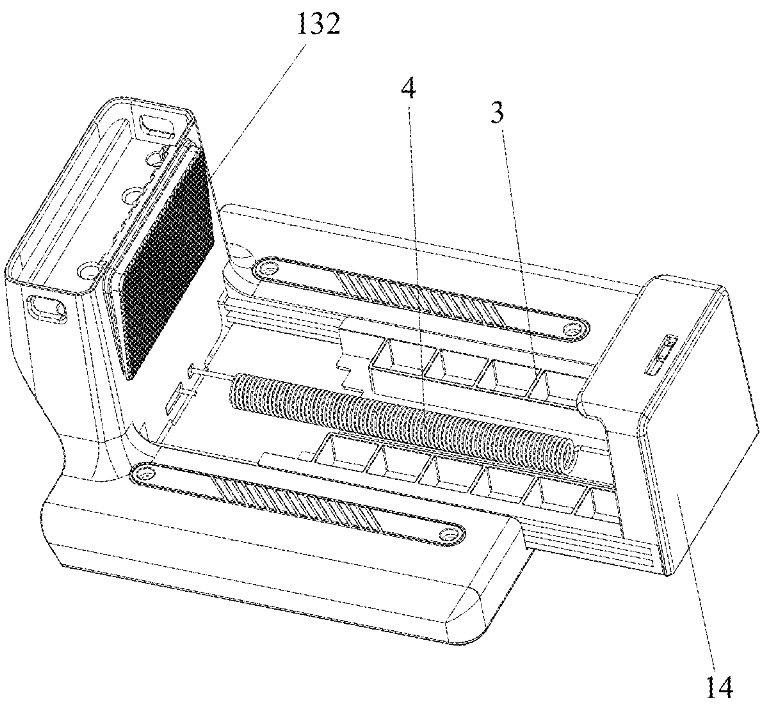
FIG. 9 is another schematic diagram showing the solar module in the solar pool lamp according to Embodiment 2.

As shown in FIG. 8 and FIG. 9, Embodiment 2 of the present disclosure differs from Embodiment 1 only in the solar module 1. The solar module 1 in Embodiment 2 includes a slider 3 and a second elastic member 4. The slider 3 is slidably connected to the second housing 13, the clamping member 14 is connected to an end of the slider 3 facing away from the clamped portion 132, and the second elastic member 4 is connected between the clamped portion 132 and the clamping member 14. The second elastic member 4 in Embodiment 2 may be a spring. During use, an operator pulls the clamping member 14 and drives the slider 3 to slide along the second housing 13 to better adapt to different specifications of swimming pool railings, and then the swimming pool railing is clamped by means of a restoring force of the spring.

The rest of the components in Embodiment 2 are the same as those in Embodiment 1, and can also achieve the same beneficial effects as Embodiment 1, which would not be repeated herein.

It should be noted that the above embodiments are merely intended to describe the technical solutions of the present disclosure, rather than to limit the present disclosure. It should be appreciated by a person of ordinary skill in the art that modifications or equivalent substitutions may still be made to the specific implementations of the present disclosure, and any modifications or equivalent substitutions made without departing from the spirit and scope of the present disclosure shall fall within the protection scope of the claims of the present disclosure to apply for approval.

What is claimed is:

1. A solar pool lamp, comprising a solar module and an illumination module, wherein the solar module comprises a solar module housing, a solar panel, and a first contact member; the solar panel is disposed on the solar module housing, the first contact member is disposed in the solar module housing, and the first contact member is electrically connected to the solar panel; the illumination module comprises an illumination module housing and an illumination lamp assembly; the illumination lamp assembly is mounted in the illumination module housing, a second contact member is provided at a top of the illumination module housing, and the second contact member is electrically connected to the illumination lamp assembly; and the illumination module housing and the solar module housing are detachably connected, and when the illumination module housing and the solar module housing are connected, the first contact member and the second contact member abut against each other to form an electrical connection;

wherein the illumination module housing comprises a bottom housing, a sealing housing, and a decorative housing; a sealing groove is formed along a periphery of the bottom housing, the sealing housing is snapped onto the sealing groove of the bottom housing, and the decorative housing covers the sealing housing and is in snap-fit with the bottom housing.

2. The solar pool lamp according to claim 1, wherein the solar module housing comprises a first housing and a second housing snapped together, the solar panel is mounted on an upper surface of the first housing, and the first contact member is mounted in the second housing.

3. The solar pool lamp according to claim 2, wherein the solar module further comprises a clamping member, the second housing is provided with a clamped portion configured to engage the clamping member, a sliding slot is formed in the second housing, and an upper part of the clamping member is slidably arranged in the sliding slot.

4. The solar pool lamp according to claim 3, wherein the solar module further comprises a knob and a screw rod, the screw rod is rotatably mounted in the sliding slot, one end of the screw rod extends outwardly from the sliding slot and is connected to the knob, and the upper part of the clamping member is threadedly connected to the screw rod.

5. The solar pool lamp according to claim 2, wherein a pressing member is respectively provided on two sides of an upper part of the decorative housing and is used for snap-fit with the solar module housing, and a first elastic member for providing an elastic force for the pressing member is provided inside the pressing member.

6. The solar pool lamp according to claim 5, wherein the solar module further comprises a slider, a clamping member, and a second elastic member; the second housing is provided with a clamped portion configured to engage the clamping member, the slider is slidably connected to the second housing, the clamping member is connected to an end of the slider facing away from the clamped portion, and the second elastic member is connected between the clamped portion and the clamping member.

7. The solar pool lamp according to claim 1, wherein the decorative housing is provided with a through hole, and light of the illumination lamp assembly passes through the sealing housing and exits from the through hole of the decorative housing.

8. The solar pool lamp according to claim 1, wherein the illumination lamp assembly comprises a main control board, a battery, and a lamp bead board; the main control board is electrically connected to the battery via wiring, the lamp bead board is electrically connected to the main control board via wiring, and the second contact member is electrically connected to the main control board via wiring.

9. The solar pool lamp according to claim 8, wherein the lamp bead board is arranged obliquely.

* * * * *